(12) United States Patent
Page

(10) Patent No.: US 7,676,946 B2
(45) Date of Patent: Mar. 16, 2010

(54) INVISIBLE MOUNTING SYSTEM

(75) Inventor: Brian Lee Page, 45650 Clearbrook La., California, MD (US) 20619

(73) Assignee: Brian Lee Page, California, MD (US)

( * ) Notice: Subject to any disclaimer, the term of this patent is extended or adjusted under 35 U.S.C. 154(b) by 0 days.

(21) Appl. No.: 12/103,139

(22) Filed: Apr. 15, 2008

(65) Prior Publication Data

US 2009/0255140 A1 Oct. 15, 2009

(51) Int. Cl.
G01D 21/00 (2006.01)
(52) U.S. Cl. .......................................... 33/613; 33/666
(58) Field of Classification Search ................. 33/613, 33/670–671, 677–679
See application file for complete search history.

(56) References Cited

U.S. PATENT DOCUMENTS

| | | | | |
|---|---|---|---|---|
| 1,496,282 A | * | 6/1924 | Taylor | 248/467 |
| 3,795,983 A | * | 3/1974 | Gallagher et al. | 33/666 |
| 4,458,872 A | * | 7/1984 | Couch | 248/497 |
| 4,930,237 A | * | 6/1990 | Oliphant | 40/617 |
| 5,107,601 A | * | 4/1992 | Semchuck | 33/759 |
| 5,398,906 A | * | 3/1995 | Aydelott | 248/547 |
| 5,605,313 A | * | 2/1997 | Erickson et al. | 248/467 |
| 5,941,046 A | * | 8/1999 | Prather | 52/717.01 |
| 6,641,892 B2 | * | 11/2003 | Luhmann | 428/99 |
| 7,441,741 B2 | * | 10/2008 | Wong | 248/477 |
| 2002/0083612 A1 | * | 7/2002 | Prather | 33/666 |

* cited by examiner

Primary Examiner—G. Bradley Bennett
Assistant Examiner—Tania C Courson

(57) ABSTRACT

A method of construction, assembly, and suspension that allows for the mounting of properly cut, placed and independently hanging pieces of sheet material to form a complete image of any size, on drywall or other substrate, without any visible means of support and minimal wall damage. Applicable to any image that best describes itself in only two colors, such as black and white, or simply, positive and negative.

5 Claims, 1 Drawing Sheet

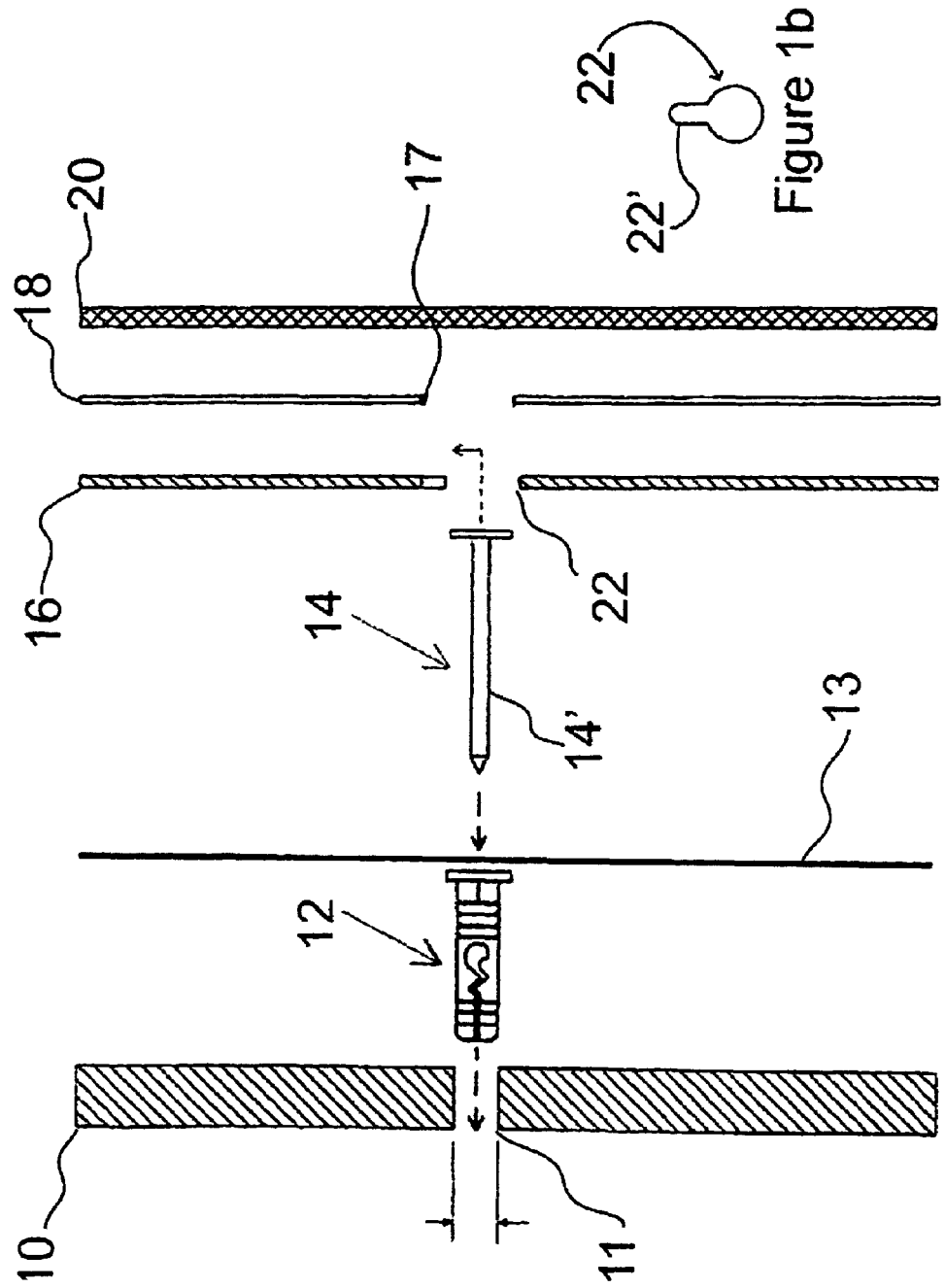

INVISIBLE MOUNTING SYSTEM

BACKGROUND OF THE INVENTION

This invention relates to method for mounting silhouette wall images such as art work and signs. In particular this invention relates to solid sheet materials in the form of single or multi piece artwork, signs, and the like, directly mounted to drywall or other structure without any visible form of suspension for any given piece of the image.

DESCRIPTION OF THE DRAWINGS

FIG. 1a is unexploded side view in cross section illustrating the method of the present invention; and FIG. 1b is a plan view of a mounting aperture shown in cross section in FIG. 1a.

BRIEF SUMMARY OF THE INVENTION

The invention provides a method for invisibly mounting art work and the like which includes the following steps:

attaching a fastener means and a finish piece to a mounting metal template having at least one keyhole for receiving at least one flat-headed mounting nail;

wherein the at least one keyhole aligns with at least one relief aperture in the fastener means;

positioning a locator template at a desired mounting location and marking the location of at least one mounting hole through the locator template onto a wall surface;

creating at least one hole in the wall surface marked by the locator template and inserting a mounting clip into the at least one hole;

wherein the at least one clip is easily removable without wall surface damage;

inserting said at least one flat-headed nail into said keyhole; and aligning said at least one flat-headed mounting nail with the corresponding mounting clip and inserting the device at least one flat-headed mounting nail into the metal mounting template to mount said device for hiding any visible means of support.

And an apparatus comprising; a metal template having at least one keyhole formed therein; a fastener means attached one side to the metal template, wherein the fastener means has a relief aperture; the relief aperture being aligned with the at least one keyhole;

a finished piece attached to the opposite side of the fastener means thus forming a sandwich of the metal template, the fastener means, and the finished piece;

a locator template which corresponds to each keyhole location and also aligns to the relief aperture;

wherein at least one hole is formed in a wall surface;

at least one mounting clip for insertion into the at least one hole in a wall surface;

wherein the at least one clip is easily removable without wall surface damage;

at least one flat-headed mounting nail which inserts in the wall surface into the at least one keyhole, leaving a portion of the flat-headed mounting nail exposed;

wherein the exposed portion of the at least one flat-headed mounting nail is aligned with the at least one mounting clip and the sandwich is pressed into each mounting clip so that the finished piece is supported hiding any means of support.

DETAILED DESCRIPTION OF THE INVENTION

Referring now to the drawing, mounting template 16 is mounted on drywall 10 via nails 14 which are inserted into clips 12 placed in selected apertures 11 in drywall 10. The shaft 14' of flat heads of nail 14 key into aperture 22 and seat in narrow portion 22' of mounting template 16 (FIG. 1b). Double-sided mounting tape 18 is adhered to mounting template 16 and artwork or sign 20.

Typically, steel forms mounting template 16 and can have a thickness of from a 32nd of an inch to an eighth of an inch with keyholes cut into it such that the shaft 14' of nail 14 can seat itself in so that any assembled part can hang on the drywall surface. Mounting template 16 can be cut from any sheet material that can be cut to an exact shape using any known of plotting machine such as, for example, laser, waterjet, plasma and like plotters.

Tape 18 can be any known double sided adhesive tape, or gel-to-solid adhesive material, that will allow enough space between mounting template 16 and artwork 20 so as to accommodate the head 14' of nail 14 via a relief aperture 17.

Artwork or sign 20 can be any properly shaped sheet cut material that would be from the outermost finish of a given image. This material can also be cut to shape from any sort of sheet material ranging in thickness from forty thousandths of an inch and upwards. Artwork 20 can be cut from any sheet material that can be cut to an exact shape using any known plotting machine such as, for example, laser, waterjet, plasma, and like plotters.

Clip 12 can be any suitable Molly-type drywall insert, sized to accommodate nail 14 and hold it firmly in place.

The invention can use any vectored file of any drawing, artwork, logo, or symbol done in digital form which can be broken down as a collection of lines that can be positive (ie., white) on one side and negative (ie., black) on the other. Each should be closed in as objects such that they are, or can be made to be, individual pieces. The color differences describe the visual polarity that makes an image appear as it does when a sign is made on a blank wall.

Artwork 20 can be any drawing, logo, or symbol, as a collection of lines and parts, visually conveying a certain item, action, verbage, and/or perspective.

A locator template 13 for positioning clip holes can be a printed rendition of the entire image, in its actual size and dimensions. What material it's made from, or printed upon, is only limited by its compaction and storability properties, its strength, and how easy it will be to print on. Most locator templates are made from paper because they will only be used a few times.

If an image is only two colors, two exact colors, such as black and white, or even green and blue, it is preferably described visually in those colors in a positive/negative format. Thus one color, for example the negative, would be the background, ie, the drywall. The other color would be the image comprised for mounting template 16, tape 18 and artwork 20. In positive/negative format, shading (such as the color gray would be in a black and white image) is not possible.

Beginning with a vectored drawing of any sort of artwork, company logo, or symbol (that is completed in black and white, or positive and negative form) two renditions of the same image are made. One copy of this image is a true and exact printout of the lines making up the image using whatever size printer may be required to match the actual size of the image on paper. The general size of both images will be limited only by the size of the machines that can print, and cut them.

Along with the lines making up the image, this printed drawing forms the locator template which has numerous printed keyholes 22, 22' placed in such a manner as to allow for ample area for tape 18 to have an abundant surface area to effectively hold mounting template 16 and artwork 20 together. The placement of these keyholes will be unique to every part of a given image and allow for variables in drywall frame construction to not be in the way of whatever keyhole the installer chooses to use. Keyholes 22, 22' are laterally abundant, or even redundant, as framework studs run vertically. The keyhole arrangement on the locator template is custom engineered according to the support required for every different piece of every different image that is produced. Keyholes 22, 22' are identical both on the paper template and in the cut sheet material mounting template 16.

The invention can be used to mount cut sheet materials directly to drywall of any known dimension. In the process of mounting, an installer first places the paper locator template 13 on a wall using masking tape. Once centered, and leveled, on the wall, the installer then searches to avoid framework studs behind drywall 10 that will prevent clips 12 from spreading on the backside of the drywall.

Once the installer locates, on the paper locator template 13, the appropriate number of keyholes as prescribed by the installation requirements of the given image, the installer will punch a small indentation, through the paper and into the wall in the exact location of 22', the center of the uppermost aperture of the keyhole printed on the paper template. The installer uses a pointy felt tip pen to place a small, colored, mark where the indentation was made in the drywall. This will enable the installer to easily see the indentations once the paper template has been taken down.

Once all the required holes 1 have been marked, the installer removes the paper locator template 13 and makes holes in the drywall where every corresponding indentation has been made. The installer inserts a clip 12 in every drilled hole 11. The wall is now ready for installation of the image.

Another copy of the same file is then engineered such that it can be cut from the top finish product (artwork, etc., 20) and assembled. There are three layers of material making up the pieces of any given image. The artwork 20 is the finish material, be it metal, carbon fiber, plastic, wood, etc., and can have a thickness ranging from thousandths of an inch up to $3/8$ of an inch depending on its weight per square inch. The finish pieces are then attached to mounting template 16 via tape 18 which can be a double sided automotive trim tape such as made and sold by 3M Company. Mounting template 16 and artwork 20 are bonded together in such a way that all of their edges match and there is no overhang unless the design of the image calls for it.

While artwork 20 can be made of multiple pieces, mounting template 16 can come from the material cutter in one piece with the keyholes engineered into it. Mounting template 16 may be in more than one piece of layer without overlapping. The backside of mounting template 16 can be painted so as to prevent rusting and the front can be treated with alcohol to promote bonding with tape 18. Artwork 20 is placed onto tape 18 leaving clearance around keyhole 22, 22'. After tape 18 has been laid onto mounting template 16 the front side of the template can be painted. A removable cover sheet on tape 18 can be left in place until one is ready to attach artwork 20.

Once assembled, each part of the whole image has three layers (mounting template 16, tape 18, and artwork 20) with numerous keyholes that an installer can use any one of. To install nails 14, the installer inserts the nail head through the larger end of the keyhole and moves it up so as to seat shaft 14' in portion 22' of the keyhole. All keyholes 22 are engineered with the smaller ends up and the larger ends down.

The installer now places a small piece of tape over the larger, bottom end 22 of the keyhole so as to keep the nail in place during object placement on the wall. Once all the nails to be used are in place, the installer holds the image piece to the wall and pushes it into the corresponding clips that have been placed into the drywall. As the nails go into the drywall, the clips spread and clamp themselves onto the nails, and the assembled piece stays attached to the wall. When all pieces have been installed into the wall, the image is complete.

What is claimed is:

1. A method for mounting a device comprising:
   attaching a fastener means and a finish piece to a mounting metal template having at least one keyhole for receiving at least one flat-headed mounting nail;
   wherein the at least one keyhole aligns with at least one relief aperture in the fastener means;
   positioning a locator template at a desired mounting location and marking the location of at least one mounting hole through the locator template onto a wall surface;
   creating at least one hole in the wall surface marked by the locator template and inserting a mounting clip into the at least one hole;
   wherein the at least one clip is easily removable without wall surface damage;
   inserting said at least one flat-headed nail into said keyhole; and
   aligning said at least one flat-headed mounting nail with the corresponding mounting clip and inserting the device at least one flat-headed mounting nail into the metal mounting template to mount said device for hiding any visible means of support.

2. The method of claim 1 wherein the step of aligning further includes attaching the locator template to the wall surface and locating the fastener locations;
   Wherein fastener locations include at least one mounting hole and at least one keyhole.

3. The method of claim 2, where locating the fastener locations further includes drilling the at least one hole in the wall surface.

4. The method of claim 1 further including the step of removing the locator template after the at least one hole is drilled in the wall surface.

5. A mounting device comprising:
   a metal template having at least one keyhole formed therein;
   a fastener means attached one side to the metal template, wherein the fastener means has a relief aperture; the relief aperture being aligned with the at least one keyhole;
   a finished piece attached to the opposite side of the fastener means thus forming a sandwich of the metal template, the fastener means, and the finished piece;
   a locator template which corresponds to each keyhole location and also aligns to the relief aperture;
   wherein at least one hole is formed in a wall surface;
   at least one mounting clip for insertion into the at least one hole in a wall surface;
   wherein the at least one clip is easily removable without wall surface damage;
   at least one flat-headed mounting nail which inserts in the wall surface into the at least one keyhole, leaving a portion of the flat-headed mounting nail exposed;
   wherein the exposed portion of the at least one flat-headed mounting nail is aligned with the at least one mounting clip and the sandwich is pressed into each mounting clip so that the finished piece is supported hiding any means of support.

\* \* \* \* \*